(12) United States Patent
Fedyk et al.

(10) Patent No.: US 8,908,537 B2
(45) Date of Patent: Dec. 9, 2014

(54) REDUNDANT NETWORK CONNECTIONS

(75) Inventors: Don Fedyk, Groton, MA (US); Shafiq Pirbhai, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 202 days.

(21) Appl. No.: 13/359,993

(22) Filed: Jan. 27, 2012

(65) Prior Publication Data

US 2013/0194911 A1 Aug. 1, 2013

(51) Int. Cl.
*H04L 12/26* (2006.01)
*H04L 29/14* (2006.01)

(52) U.S. Cl.
USPC ............................. 370/244; 370/252; 370/351

(58) Field of Classification Search
CPC ............ H04L 12/2636; H04L 12/2639; H04L 12/2642
See application file for complete search history.

(56) References Cited

U.S. PATENT DOCUMENTS

| | | | |
|---|---|---|---|
| 7,515,525 B2* | 4/2009 | Appanna et al. | 370/217 |
| 2006/0182122 A1* | 8/2006 | Davie et al. | 370/395.53 |
| 2006/0274746 A1* | 12/2006 | Kuschke et al. | 370/389 |
| 2007/0047436 A1* | 3/2007 | Arai et al. | 370/219 |
| 2009/0010153 A1* | 1/2009 | Filsfils et al. | 370/218 |
| 2012/0127855 A1* | 5/2012 | Alon et al. | 370/218 |

FOREIGN PATENT DOCUMENTS

| | | |
|---|---|---|
| EP | 1 956 766 A1 | 8/2008 |
| EP | 2367320 A1 | 9/2011 |
| WO | 2010/052028 A1 | 5/2010 |
| WO | 2012/007164 A1 | 1/2012 |

OTHER PUBLICATIONS

International Search Report for PCT/US2013/022545, dated May 7, 2013.
IEEE Computer Society, IEEE Standard for Local and metropolitan area networks—virtual bridged local area networks, Dec. 17, 2007, pp. 1-260, IEEE 802.1ag, New York, NY.
International Telecommunications Union, Ethernet Linear Protection Switching, Jun. 2011, pp. 1-94, Recommendation ITU-T G.80311Y.1342.
Inernational Telecommunications Union, B-ISDN Asynchronous Transfer Mode Functional Characteristics, 1991, pp. 1-14, ITU-T 1.150, Geneva.
E.Rosen et al., Multiprotocol Label Switching Architecture, Jan. 2001, pp. 1-61, RFC 3031, The Internet Society.
W.Simpson, PPP in Frame Relay, Jun. 1996, pp. 1-10, RFC 1973, The Internet Society.
J. Abley et al., IPv4 Multihoming Practices and Limitations, Jul. 2005, pp. 1-13, RFC 4116, The Internet Society.

(Continued)

*Primary Examiner* — Omar Ghowrwal
(74) *Attorney, Agent, or Firm* — Kramer & Amado, P.C.

(57) ABSTRACT

Various exemplary embodiments relate to a method and related network node including one or more of the following: performing an active gateway election to determine whether the provider edge device will be an active gateway for a connection; if the provider edge device will be the active gateway for the connection, indicating to a customer edge device that no fault is currently associated with a link between the customer edge device and the provider edge device; and if the provider edge device will not be the active gateway for the connection, indicating to the customer edge device that a fault is currently associated with the link between the customer edge device and the provider edge device.

15 Claims, 5 Drawing Sheets

(56) References Cited

OTHER PUBLICATIONS

Y. Rekhter et al., A Boader Gateway Protocol 4 (BGP-4), Jan. 2006, pp. 1-104, RFC 4271, The Internet Society.
E. Rosen et al., BGP/MPLS IP Virtual Private Networks(VPNs), Feb. 2006, pp. 1-47, RFC 4364, The Internet Society.
IEEE Computer Society, IEEE Standard for Ethernet, Dec. 28, 2012, pp. 1-634,IEEE 802.3, The Internet Society.
IEEE Standard for Information Technology, Part 3: Carrier sense multiple access with collision detection (CSMA/CD) Access method and physical layer specifications, Dec. 2008, 1-671.

* cited by examiner

REDUNDANT NETWORK CONNECTIONS

TECHNICAL FIELD

Various exemplary embodiments disclosed herein relate generally to telecommunications networks.

BACKGROUND

Many computer networks, the most noteworthy of which is the Internet, are implemented as geographically-distributed, multi-tiered, and multi-technology associations of computing devices. To enable communication between two devices, traffic may pass through numerous intermediate devices according to many different protocols. For example, in the case of the Internet, local traffic may be exchanged according to the Ethernet protocol while traffic crossing the backbone of the network may be passed according to the multi-protocol label switching (MPLS) protocol. As such, various mechanisms have been developed to manage such multi-technology handovers and thereby ensure end-to-end connectivity.

While handover mechanisms may be sufficient to enable communication in ideal network conditions, conditions in practice are rarely ideal, Intermediate routing devices and the links connecting these devices may become overloaded or inoperable for various reasons and may render a particular communication path broken. Many networks, however, provide a robust mesh of connections, affording multiple communication paths between any two devices. Thus, if one communication path is severed, communication may be switched to a different path, thereby preserving the connection between the two devices. To provide such functionality, various redundancy mechanisms have also been developed.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a provider edge device for enabling connection redundancy, the method including one or more of the following: performing an active gateway election to determine whether the provider edge device will be an active gateway for a connection; if the provider edge device will be the active gateway for the connection, indicating to a customer edge device that no fault is currently associated with a link between the customer edge device and the provider edge device; and if the provider edge device will not be the active gateway for the connection, indicating to the customer edge device that a fault is currently associated with the link between the customer edge device and the provider edge device.

Various exemplary embodiments relate to a provider edge device for enabling connection redundancy, the provider edge device including one or more of the following: a customer edge interface configured to communicate with a customer edge device; an active gateway election module configured to determine whether the provider edge device will be an active gateway for a connection; and a fault reporting module configured to: if the active gateway election module determines that the provider edge device will be the active gateway for the connection, indicate to the customer edge device that no fault is currently associated with a link between the customer edge device and the provider edge device, and if the active gateway election module determines that the provider edge device will not be the active gateway for the connection, indicate to the customer edge device that a fault is currently associated with the link between the customer edge device and the provider edge device.

Various alternative embodiments additionally include determining that a paired provider edge device is currently experiencing a fault, wherein the step of performing an active gateway election is performed in response to determining that a paired provider edge device is currently experiencing a fault.

Various alternative embodiments additionally include detecting a fault associated with the link between the provider edge device and the customer edge device; and sending an indication to a paired provider edge device that the provider edge is currently experiencing a fault.

Various alternative embodiments additionally include detecting a fault on at least two links between the provider edge device and other devices in the network; sending an indication to a paired provider edge device that the provider edge is currently experiencing a fault.

Various embodiments are described wherein the step of indicating to a customer edge device that no fault is currently associated with a link between the customer edge device and the provider edge device includes: constructing a connectivity fault message that indicates that no fault has been detected; and transmitting the connectivity fault message to a maintenance endpoint of the customer edge device.

Various embodiments are described wherein the active gateway election is performed according to the border gateway protocol.

Various embodiments are described wherein the active gateway election includes: determining whether the provider edge is currently experiencing a connectivity fault management (CFM) fault; determining whether a paired provider edge is currently experiencing a CFM fault; if the provider edge is not currently experiencing a CFM fault and the paired provider edge is currently experiencing a CFM fault, determining that the provider edge device will be the active gateway; and if the provider edge is currently experiencing a CFM fault and the paired provider edge is not currently experiencing a CFM fault, determining that the provider edge device will not be the active gateway.

Various embodiments are described wherein the active gateway election includes: determining whether the provider edge is currently experiencing a pseudowire (PW) fault; determining whether a paired provider edge is currently experiencing a PW fault; if the provider edge is not currently experiencing a PW fault and the paired provider edge is currently experiencing a PW fault, determining that the provider edge device will be the active gateway; and if the provider edge is currently experiencing a PW fault and the paired provider edge is not currently experiencing a PW fault, determining that the provider edge device will not be the active gateway.

Various embodiments are described wherein the connection is a control connection, the method further including: identifying a fate-shared connection associated with the control connection; if the provider edge device will be the active gateway for the control connection, indicating to a customer edge device that no fault is currently associated with a link between the customer edge device and the provider edge device for the fate-shared connection; and if the provider edge device will not be the active gateway for the control connection, indicating to the customer edge device that a fault is currently associated with the link between the customer edge device and the provider edge device for the fate-shared connection.

Various exemplary embodiments relate to a system for providing redundancy in a virtual leased line (VLL) service, the system including one or more of the following: a first provider edge device configured to: support an VLL service between a first customer edge device and a second customer edge device; maintain a first maintenance endpoint (MEP) associated with a first link between the first provider edge device and the first customer edge device; execute a border gateway protocol (BGP) multihoming process to elect, among the first provider edge device and a second provider edge device, a designated forwarder for the VLL service; and report a status associated with the first link to the first customer edge device via the first MEP based on the outcome of the BGP multihoming process.

Various alternative embodiments additionally include the second provider edge device, wherein the second provider edge device is configured to: support the VLL service between the first customer edge device and the second customer edge device; maintain a second maintenance endpoint (MEP) associated with a second link between the second provider edge device and the first customer edge device; execute the border gateway protocol (BGP) multihoming process to elect, among the first provider edge device and the second provider edge device, the designated forwarder for the VLL service; and report a status associated with the second link to the first customer edge device via the second MEP based on the outcome of the BGP multihoming process.

Various alternative embodiments additionally include the first customer edge device, wherein the first customer edge device is configured to: maintain a third MEP associated with the first MEP that receives the report of the status of the first link from the first MEP; and maintain a fourth MEP associated with the second MEP that receives the report of the status of the second link from the second MEP; and switch VLL service traffic between the first provider edge and the second provider edge based on the status associated with the first link and the status associated with the second link, according to a G.8031 standard.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

While various handover and redundancy mechanisms have been developed and implemented in communication networks, there remains a need for mechanisms tailored to as-of-yet unmet considerations. For example, many redundancy mechanisms rely on MAC address learning to provide their functionality. However, in many cases, it is undesirable to implement such address learning because, for example, the known algorithms may not scale well, for example, due to the requirement of learning and storage of MAC addresses. Thus, there exists a need for a method and device for implementing a redundant point-to-point service that does not rely on MAC address learning.

Referring now to the drawings, in which like numerals refer to like components or steps, there are disclosed broad aspects of various exemplary embodiments.

Figure 1:
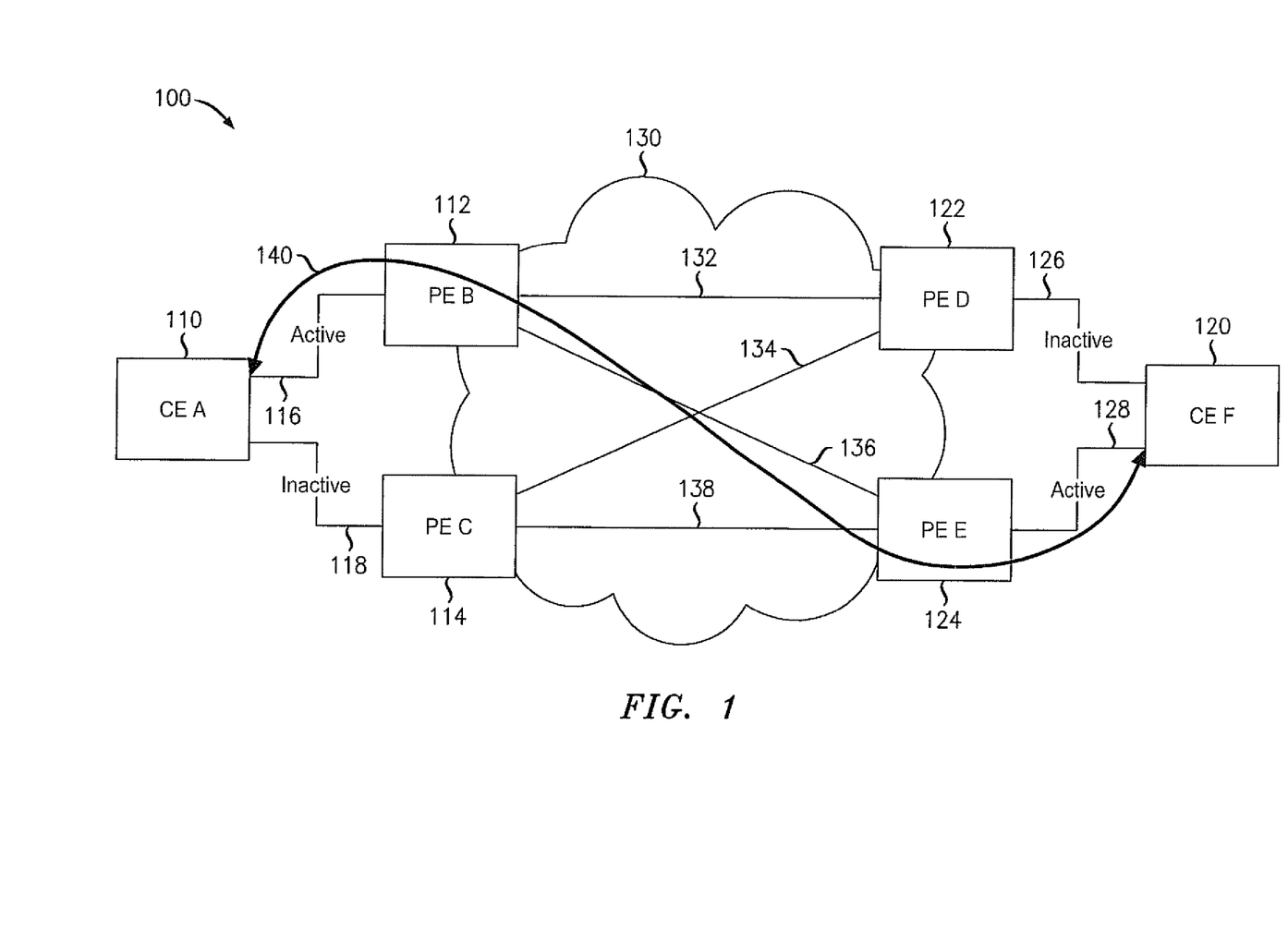
FIG. 1 illustrates an exemplary network for providing a redundant network connection.

FIG. 1 illustrates an exemplary network 100 for providing a redundant network connection. Exemplary network 100 may provide communication between two customer edge (CE) devices 110, 120. CE devices 110, 120 may each be a router located at a customer premises, such as a user's household or a lower-tier ISP location. CE devices 110, 120 may connect to one or more end-user devices (not shown), either directly or through one or more intermediate nodes (not shown). Examples of end user devices may include personal computers, laptops, tablets, mobile phones, servers, and other devices. Such end user devices may communicate with each other via network 100 and, as such, CE A 110 and CE F 120 may exchange data with each other to provide such communication.

Each CE 110, 120 may be connected to one or more provider edge (PE) devices 112, 114, 122, 124, either directly or through one or more intermediate devices (not shown). For example, CE A 110 may be connected to PE B 112 and PE C 114 via links 116, 118, respectively, while CE F 120 may be connected to PE D 122 and PE E 124 via links 126, 128, respectively. Each PE device 112, 114, 122, 124 may be a router located at a provider premises. For example, PE B 112 may be located at a premises of a first provider, PE C 114 may be located at a premises of a second provider, and both PE D 122 and PE E 124 may be located at the premises of a third provider. Various alternative arrangements for the ownership and location of PE devices 112, 114, 122, 124 will be apparent to those of skill in the art. Links 116, 118, 126, 138 may be Ethernet, ATM, Frame Relay, or other connections. In various embodiments, paired PE devices may further be directly connected via, for example, interchassis-backup (ICB) pseudowires (PW) (not shown). For example, PE B 112 and PE C 114 may be connected by one or more ICB PWs while PE D 122 and PE E 124 may also be connected by one or more ICB PWs. Such ICB PWs may be used to redirect traffic between paired PE devices immediately after a CE device or other device switches traffic from one PE to another.

PE devices 112, 114, 122, 124 may enable communication between CE devices 110, 120 over packet network 130. Packet network 130 may be a backbone network and may enable communication according to the multi-protocol label switching (MPLS) protocol. Accordingly, packet network 130 may include a number of intermediate devices (not shown) for enabling communication between PE devices 112, 114, 122, 124. PE devices 112, 114, 122, 124 may communicate with each other via links 132, 134, 136, 138. Links 132, 134, 136, 138 may each constitute paths across packet network 130 and may represent pseudowires established for a service across exemplary network 100. As shown, PE B 112 may be in communication with both PE D 122 and PE E 124 via links 132, 136, respectively. PE C may also be in communication with both PE D 122 and PE E 124 via links 134, 138, respectively.

As illustrated, packets may be exchanged between CE A 110 and CE F 120 over multiple different paths. In particular, CE A 110 may transmit packets to either PE B 112 or PE C 114, each of which may forward the packets to either PE D 122 or PE E 124, each of which may, in turn, forward packets to CE F 120. In various embodiments, it may be desirable for related traffic to traverse only one such path. Accordingly, CE A 110 may decide to forward traffic to only one of PE devices 112, 114. To provide such functionality, CE A 110 may implement Ethernet linear protection switching, as defined in ITU-T G.8031. It will be apparent to those of ordinary skill in the art that other redundancy or path selection methods may be employed other than G.8031. As shown, CE A 110 may regard link 116 as active and link 118 as inactive for a particular connection 140. Likewise, CE F 120 may regard link 126 as inactive and link 128 as active for the connection 140. Thus connection 140, which may be, for example, a virtual leased line (VLL) service, may traverse links 116, 136, 128 to provide service between CE A 110 and CE F 120.

Later, if some fault or other change to network 100 renders this path severed or inefficient, the path taken by connection 140 may be altered to maintain communication. For example, if a fault occurs in link 116, PE B 112, or both links 132, 136, CE A 110 may determine that link 118 should be regarded as active and link 116 as inactive. In various embodiments herein, as will be described below, this determination by CE A 100 may be driven by separate processes running on PE B 112 and/or PE C 114. In various embodiments, these PE processes may operate prior to CE link switching and thus fully drive the switch, while in other embodiments, the PE processes and CE link switching may operate in parallel. Thereafter, connection 140 may instead traverse links 118, 138, 128.

It should be noted that, in various embodiments, active and inactive links may be chosen on a per connection or per connection group basis. For example, a second connection (not shown) may traverse links 118, 138, 128 while connection 140 traverses the links as illustrated. In this way, redundant devices and links may also be leveraged for load balancing.

Figure 2:
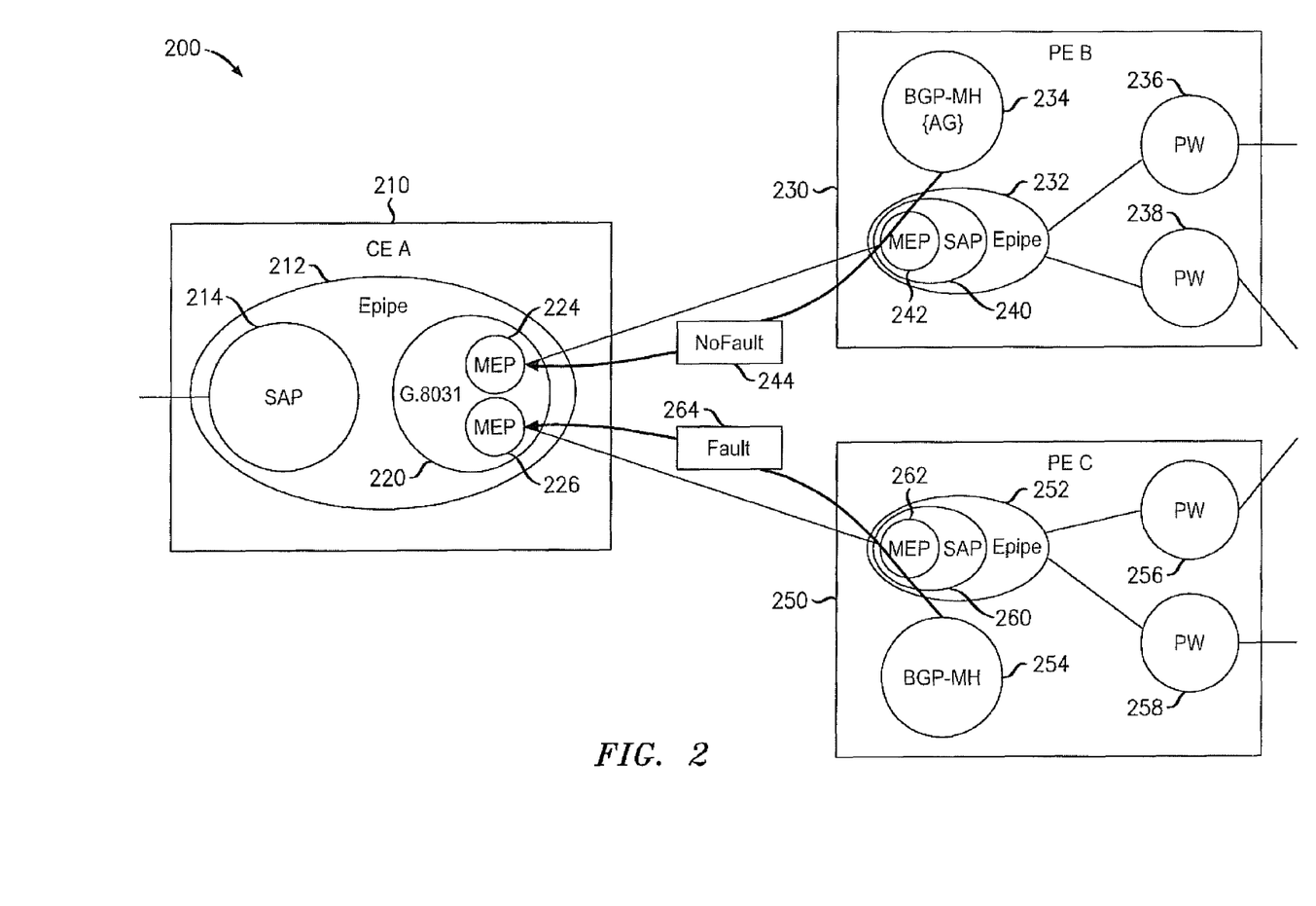
FIG. 2 illustrates an exemplary network for enabling connection redundancy.

FIG. 2 illustrates an exemplary network 200 for enabling connection redundancy. Exemplary network 200 may illustrate a more detailed view of CE A 110, PE B 120, and PE C 130 of exemplary network 100. CE A 210, PE B 230, and PE C 250 may correspond to CE A 110, PE B 120, and PE C 130, respectively. As shown, CE A 210 may be configured with a VLL Epipe endpoint 212 for providing a VLL Epipe service to another CE such as, for example, CE F 120 of exemplary network 100. The person of ordinary skill in the art will understand the term "Epipe" to refer to a VLL service for transporting Ethernet frames over an IP/MPLS network and may encompass an E-Line service. It should be apparent that the various mechanisms described herein may be applicable to other VLL services such as, for example, Ipipes, Apipes, Fpipes, and/or Cpipes.

CE A 210 may also be configured with a service access point (SAP) 214 facing the customer and providing a user device access to the Epipe 212. The Epipe 212 may be configured to provide an Ethernet linear protection switching service between PE B 230 and PE C 250 according to ITU-T G.8031 220. As part of the G.8031 service, CE A 210 may maintain maintenance endpoints (MEPs) 224, 226 for monitoring the status of the connection to PE B 230 and PE C 250, respectively. MEPS 224, 226 may be implemented according to various Ethernet operations, administration, and maintenance (OAM) protocols known to those of skill in the art. The G.8031 service may use status information obtained from MEPs 224, 226 to make decisions regarding protection switching. For example, if MEP 226 detects a fault or receives an indication of a fault from an associated MEP, 0.8031 may direct traffic to PE B 230 instead.

PE B 230 may be configured to support the Epipe service 232 and may be configured with a SAP 240 and a MEP 242. MEP 242 may be paired with MEP 224 on the CE A 210 to monitor the link between the two devices. PE B 230 may also be configured with pseudowire (PW) services 236, 238 for communicating with provider edge devices (not shown) at other locations such as, for example, PE D 122 and PE 124 of exemplary network 100, respectively. The Epipe service 232 on PE B 230 may select a PW 236, 238 for carrying Epipe traffic and forward all such traffic over the selected PW 236, 238. This selection may be based on coordination with other PEs or CEs. For example, if PE B 230 is aware that the PE to which PW 238 connects is active for the Epipe, PE B 230 may forward all Epipe traffic over PW 238.

PE C 250 may be implemented in a similar manner to PE B 230. For example, PE C may be configured to support Epipe 252, and PWs 256, 258. PE C 250 may also maintain a SAP 260 and a MEP 262 that is paired with MEP 226 of CE A 210. Because PE B 230 and PE C 250 provide redundant service to CE A 210, the PE devices may be referred to as "paired." As previously explained, PE B 230 and PE C 250 may be connected via one or more ICB PWs (not shown) for redirecting in-flight traffic after CE A 210 redirects traffic from one PE to another.

PE B 230 and PE C 250 may exert some control over the operation of the G.8031 service on CE A 210. For example, PE B 230 and PE C 250 may each be configured to operate a border gateway protocol (BGP) multi-homing (MH) service 234, 254 configured to control at least two connection points independently of other connections such as, in this case, SAP 240, 260, respectively, and an endpoint on CE A 210. BGP-MH service 234, 254 may operate between the two PE devices 230, 250 to elect one of PE B 230 and PE C 250 as designated forwarder according to the specifics of that protocol. In various embodiments, BGP-MH services 234, 254 may communicate with each other via an additional or existing link (not shown) between PE device 230, 250. The elected designated forwarder may then operate as an active gateway (AG). It should be apparent that various alternative protocols may be used instead of BGP-MH to elect an active gateway or to otherwise select one of PE B 230 and PE C 250 to carry traffic.

As shown, the BGP-MH service 234 running on PE B 230 may determine that PE B 230 is designated forwarder for the Epipe. In response, BGP-MH service 234 may cause MEP 242 to indicate to MEP 224 on CE A 210 that no fault has been detected in association with the link between CE A 210 and PE B 230. This indication may include affirmatively sending a connectivity fault management (CFM) message 244 indicating "NoFault" in an interface status (ifStatus) type-length-value (TLV) field. Alternatively, this indication may include refraining from sending such a message when a previous CFM message sent by MEP 242 has indicated "NoFault," thereby allowing CE A 210 to continue under the assumption that there is no fault in the connection between CE A 210 and PE B 230. By making this indication, PE B 230 may indicate that it is available to receive traffic.

BGP-MH service 254 running on PE C 250, on the other hand, may come to the conclusion that PE C 250 should not operate as designated forwarder for the Epipe. In response to this determination, BGP-MH service 254 may cause MEP 262 to indicate a fault to MEP 226. This indication may include affirmatively sending a CCM message 264 that notifies MEP 226 of a fault or refraining from sending a message when a previously sent CCM message indicated a fault. Thereafter, the G.8031 service on CE A 210 will set PE C 250 as inactive for the purposes of the Epipe 212 because CE A 210 believes PE C 250 to be unreachable or otherwise unusable.

It should be apparent from the foregoing description that the system described enables BGP-MH implementations 234, 254 to control the operation of a G.8031 service without any modification to the operation of the G.803 I service. In particular, the BGP-MH implementations 234, 254 may select one PE 230, 250 to operate as designated forwarder and thereafter may use CFM methods to indicate that only the active gateway has a working connection to CE A 210. On this assumption, the CE A 210 may have no choice but to forward traffic to the active gateway, which is PE B 230 in the illustrated example.

It should also be apparent that while the examples provided herein make reference to particular protocols such as VLL, BGP-MH, G.8031, and CFM, various alternative combinations of protocols may be used to provide the described functionality. For example, an alternative embodiment may utilize virtual private LAN service (VPLS) instead of VLL. Various modifications to enable the use of such protocols will be apparent to those of skill in the art.

Various embodiments may provide for updating the active gateway upon the occurrence of particular events within network 200. For example, PE B 230 may detect a true fault associated with the link between CE A 210 and PE B 230. In various embodiments, the fault associated with the link between CE A 210 and PE B 230 may include, for example, PE B 230 becoming inoperable, the link between CE A 210 and PE B 230 itself going down, or faults occurring on other links down- or upstream that are likely to impact traffic over the link between CE A 210 and PE B 230. Such a fault may be detected by, for example, by the PE device 230 itself discovering a fault or by the PE device 230 receiving a message from another device indicating the detection of a fault elsewhere in the network, As another example, PE B 230 may determine that both PWs 236, 238 are currently faulty and cannot be used to communicate with the PEs on the opposite side of the network. Either of these conditions may render PE B 230 an unsatisfactory choice for carrying the traffic related to the Epipe service. In response to detection of either condition, PE B 230 may send an indication to its paired PE, PE C 250, indicating that PE B 230 is currently experiencing a fault. This may trigger both BGP-MH 234 and BGP-MH 254 to perform the active gateway election procedure again. This time, based on the knowledge of connectivity faults associated with PE B 230, BGP-MH 254 may determine that PE C 250 should now be designated forwarder. BGP-MH 254 may then proceed to indicate, via MEP 262, that there is no fault in the connection between MEP 262 and MEP 226, as discussed above with respect to PE B 230. Thereafter, the G.8031 service on CE A 210 may transmit traffic associated with Epipe 212 to PE C.

Various embodiments may further implement "fate sharing" to reduce signaling and state overhead. In such embodiments, PE B 230 and PE C 250 may select an existing Epipe to serve as a control. Alternatively, PE B 230 and PE C 250 may establish a new Epipe to serve exclusively as a control. The operation of BGP-MH 234, 254 may then occur as described above with respect to this control Epipe. PE B 230 and PE C 250 may also support a number of additional Epipes (not shown) that are configured to share a fate with the control Epipe. A SAP configured on the PE 230, 250 for each such fate-shared Epipe may monitor the status of the control Epipe and mirror the monitored status. Thus, if the control Epipe indicates a fault, the SAP for each fate-shared Epipe may also indicate a fault, thereby ensuring that the CE 210 chooses the same PE 230, 250 to handle all traffic from any of the fate-shared Epipes.

Figure 3:
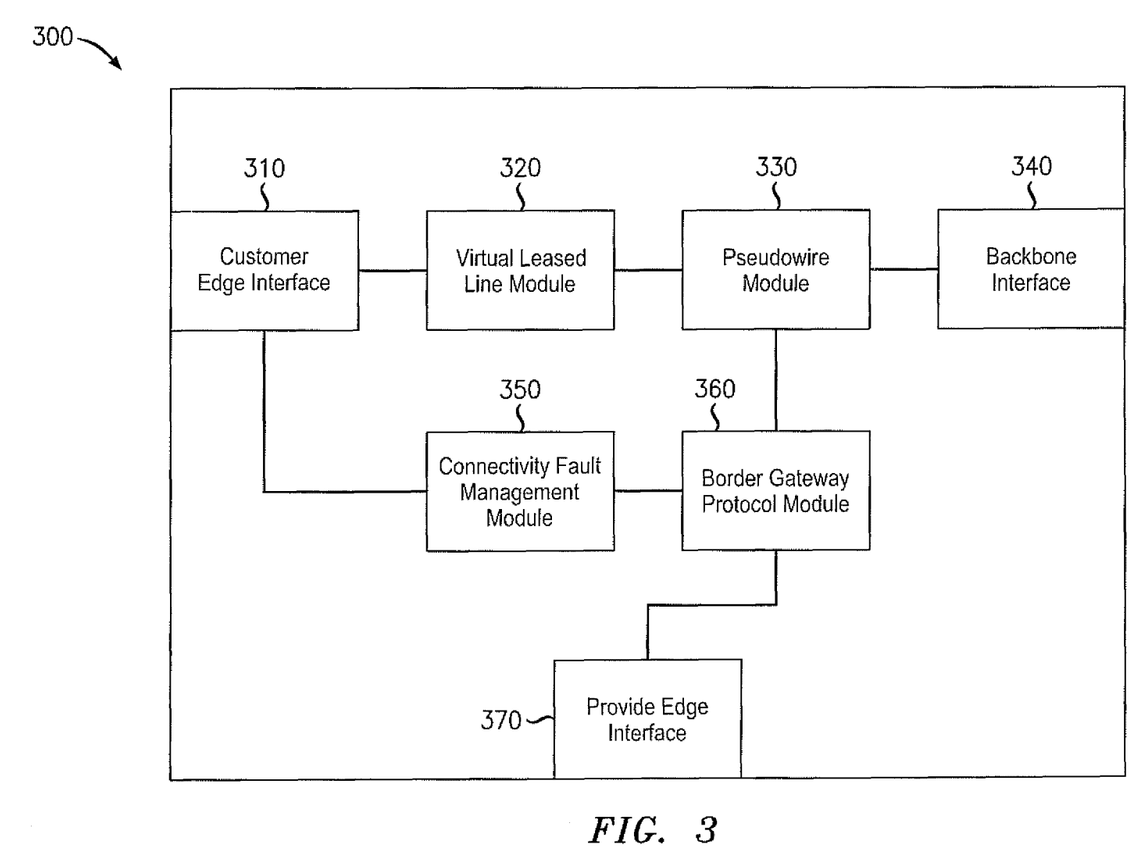
FIG. 3 illustrates an exemplary provider edge device for enabling connection redundancy.

FIG. 3 illustrates an exemplary provider edge (PE) device 300 for enabling connection redundancy. PE device 300 may correspond to one or more of PE devices 112, 114, 122, 124, 230, 250. PE device 300 may include a customer edge interface 310, virtual leased line module 320, pseudowire module 330, backbone interface 340, connectivitiy fault management module 350, border gateway protocol module 360, and/or provider edge interface 370. It will be understood that various components of PE device 300 may be abstracted to a degree and that PE device 300 may include a number of hardware components implementing or supporting the components described herein. For example, PE device 300 may include one or more processors for implementing the functionality described herein. As used herein, the term "processor" will be understood to include processors and other similar hardware components such as field programmable gate arrays and/or application-specific integrated circuits.

Customer edge interface 310 may be an interface comprising hardware and/or executable instructions encoded on a machine-readable storage medium configured to communicate with at least one other device, such as a CE device. In various embodiments, customer edge interface 310 may include one or more interfaces that communicate according to a protocol such as Ethernet, Frame Relay, ATM, and/or PPP. During operation, customer edge interface 310 may communicate with one or more customer edge devices.

Virtual leased line (VLL) module 320 may include hardware and/or executable instructions on a machine-readable storage medium configured to provide a VLL service. VLL module 320 may be configured with one or more SAPs for VLL services and, upon receiving traffic from a CE device, associate the traffic with an appropriate SAP. After determining that received traffic is associated with a particular SAP for a VLL service, VLL module 320 may select an appropriate pseudowire over which to forward the traffic. VLL module 320 may then pass the traffic and selection on to pseudowire module 330 for further processing. VLL Module 320 may also be configured to process traffic in the reverse direction as well. In particular, VLL module 320 may receive traffic from pseudowire module 330, associate it with a particular VLL service, and forward the traffic to one or more customer edge devices via customer edge interface 310. It will be apparent that the foregoing description of implementing a VLL service may be a simplification in some respects. Various additional or alternative details for implementing VLL services will be apparent to those of skill in the art.

Pseudowire (PW) module 330 may include hardware and/ or executable instructions on a machine-readable storage medium configured to provide and maintain pseudowires across a network to other PE devices. For example, PW module 320 may receive traffic from VLL module 320 and an indication of a PW over which to transmit the traffic. PW module 330 may then encapsulate the traffic in an appropriate tunneling protocol such as, for example, MPLS, and forward the encapsulated traffic to another PE device via backbone interface 340. PW module 330 may also handle traffic flowing in the opposite direction. For example, PW module 330 may receive traffic via backbone interface 340, decapsulate the traffic, and pass the traffic to VLL module 320 for further processing. It will be apparent that the foregoing description of implementing a PW service may be a simplification in some respects. Various additional or alternative details for implementing PW services will be apparent to those of skill in the art.

PW module 330 may also provide various maintenance functions with respect to established pseudowires. For example, PW module 330 may detect faults in established PWs or receive indications of faults from other devices supporting a multi-segment PW. Upon determining that one or more PWs associated with a VLL are experiencing faults, PW module 330 may send an indication of such to border gateway protocol module 360. In some embodiments, PW module 330 may only send such an indication when all PWs associated with a VLL are experiencing faults.

Backbone interface 340 may be an interface comprising hardware and/or executable instructions encoded on a machine-readable storage medium configured to communicate with at least one other device that forms part of a network backbone. In various embodiments, backbone interface 340 may include one or more interfaces that communicate according to a protocol such as MPLS.

Connectivity fault management (CFM) module 350 may include hardware and/or executable instructions on a machine-readable storage medium configured to provide connectivity fault management with respect to various links established via customer edge interface 310. For example, CFM module 350 may implement Ethernet OAM according to IEEE 802.1ag. As such, CFM module 350 may establish and maintain various MEPs associated with customer edge interface 310. During the course of operation, CFM module 350 may discover faults on various links associated with customer edge interface 310. Upon discovering such a fault, CFM module 350 may report the fault to border gateway protocol module 360. It will be appreciated that various alternative fault management protocols may be used instead of Ethernet OAM. Accordingly, CFM module 350 may be referred to as a "fault reporting module," to refer to a module that implements any fault management functions, regardless of whether it is implemented according to Ethernet OAM or another protocol.

In addition to the normal CFM operation, CFM module 350 may perform various functions at the request of BGP module 360. For example, under various circumstances, BGP module 360 may instruct CFM module 350 to construct and send a CFM message to a particular MEP. Thus, upon request, CFM module 350 may construct and transmit a CFM message indicating a fault regardless of the actual existence of such a fault. Likewise, the CFM module 350 may, on request by BGP module 360, construct and send a CFM message indicating that no fault exists.

Border gateway protocol (BGP) module 360 may include hardware and/or executable instructions on a machine-readable storage medium configured to implement various aspects of the border gateway protocol. For example, BGP module 360 may implement the designated forwarder election process defined for BGP multi-homing applications. This designated forwarder may then be used as the active gateway (AG). It will be appreciated that various alternative AG election methods may be employed instead of BGP. Accordingly, BGP module 360 may be referred to as an "AG election module" to refer to a module configured to elect an AG, regardless of whether it is implemented according to BGP or some other protocol.

BGP module 360 may elect an AG under various circumstances. For example, on the establishment of a new VLL service, BGP module 360 may make an initial election of an AG. BGP module 360 may perform the election process again in response to changing network conditions. For example, if either CFM module 350 or PW module 330 reports a fault to BGP module 360, BGP module 360 may proceed to perform AG election based on the new information.

BGP module 360 may further be configured to communicate with one or more paired PE devices via provider edge interface 370. In cases where CFM module 350 or PW module 330 report a fault to BGP module 360, BGP module 360 may send an indication that PE 300 is experiencing a fault to one or more paired PE devices via provider edge interface 370. BGP module 360 may also receive similar indications from paired PE devices via provider edge interface 370. BGP module 360 may perform AG election again in response to receiving such an indication.

After performing the AG election process, as will be described in greater detail below with respect to FIG. 6, BGP module 360 may have decided whether PE 300 will be designated forwarder for the VLL service. If the PE 300 will be designated forwarder for the VLL service, BGP module may indicate to an appropriate CE device that there is no fault on the link between CE interface 310 and that CE device. This may include instructing CFM module 350 to construct and transmit a CFM message. On the other hand, if the PE 300 will not be designated forwarder for the VLL service, BGP module may indicate to an appropriate CE device that a fault exists on the link between CE interface 310 and that CE device. Again, this may include instructing CFM module 350 to construct and transmit a CFM message.

Provider edge interface 370 may be an interface comprising hardware and/or executable instructions encoded on a machine-readable storage medium configured to communicate with at least one other device, such as a paired PE device. In various embodiments, provider edge interface 370 may include one or more interfaces that communicate according to a protocol such as Ethernet, Frame Relay, ATM, and/or PPP. During operation, provider edge interface 370 may communicate with one or more customer edge devices. In various embodiments, provider edge interface 370 may share at least some hardware in common with customer edge interface 310.

Figures 4, 5:
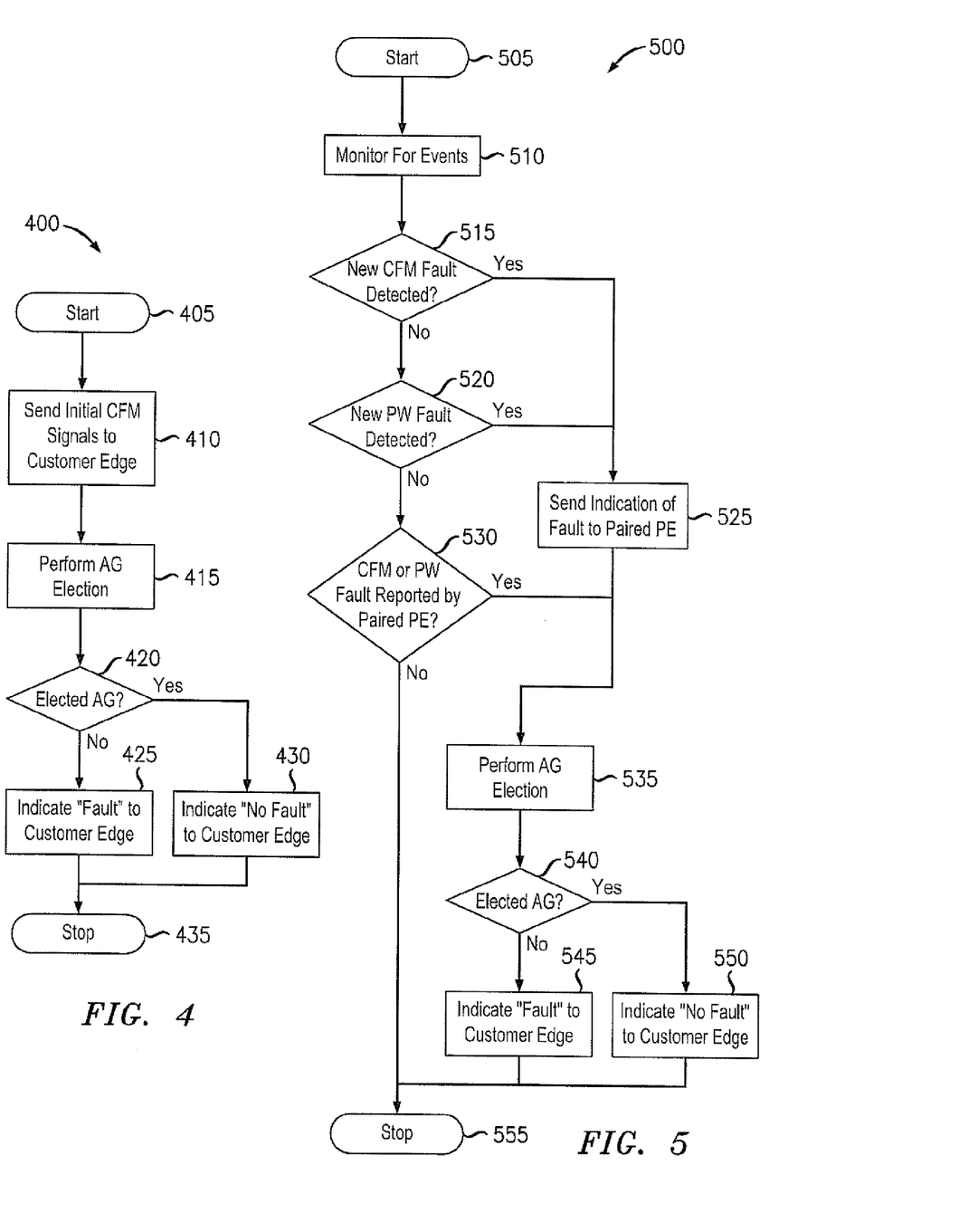
FIG. 4 illustrates an exemplary method for controlling an initial selection of a provider edge device.
FIG. 5 illustrates an exemplary method for controlling a selection of a provider edge device based on the occurrence of various faults.

FIG. 4 illustrates an exemplary method 400 for controlling an initial selection of a provider edge device. Method 400 may be performed by the components of a PE device such as PE device 300. For example, method 400 may be performed by CFM module 350 and/or BGP module 360.

Method 400 may begin in step 405 and proceed to step 410 where the PE device may send initial CFM signals to a CE device. For example, the PE device may send a CFM message indicating a fault to an appropriate MEP configured on the CE device. Next, in step 415, the PE device may perform AG election to determine whether the PE device will be designated forwarder. An example of an AG election process will be described in greater detail below with respect to FIG. 6.

In step 420, the PE device may evaluate whether the AG election process has elected the PE device as designated forwarder. If not, method 400 may proceed to step 425 where the PE device may indicate a fault to the CE device. In various embodiments, this step may include simply refraining from sending additional CFM messages. In particular, because a fault CFM message was sent previously in step 410, it may be unnecessary to send an additional fault CFM message. Method 400 may then proceed to end in step 435.

If, on the other hand, the AG election process of step 415 elects the PE as designated forwarder, method 400 may instead proceed from step 420 to step 430. In step 430, the PE device may indicate a "no fault" condition to the CE device. In various embodiments, this step may include simply refraining from sending additional CFM messages. Alternatively, because the previous message sent in step 410 indicated a fault, the PE device may construct and transmit a new "no fault" CFM message to the appropriate MEP configured on the CE device. Method 400 may then proceed to end in step 435.

FIG. 5 illustrates an exemplary method 500 for controlling a selection of a provider edge device based on the occurrence of various faults. Method 500 may be performed by the components of a PE device such as PE device 300. For example, method 500 may be performed by CFM module 350 and/or BGP module 360.

Method 500 may begin in step 505 and proceed to step 510 where the PE device may monitor for various events that may impact the network. After receiving an indication of such an event, method 500 may proceed to step 515 where the PE device may determine whether the event included the detection of a new CFM fault at the PE device. If so, method 500 may proceed to step 525. Otherwise, method 500 may proceed to step 520. In step 520, the PE device may determine whether the event included the detection of a new pseudowire fault. Again, if so, method 500 may proceed to step 525. Otherwise, method 500 may proceed to step 530 where the PE device may determine whether the event included receiving an indication that a paired PE is currently experiencing a fault. For example, the PE device may receive a message indicating that a paired PE device has detected a CFM or PW fault. If a paired PE device is experiencing a fault, method 500 may proceed to step 535. Otherwise, method 500 may proceed to end in step 555.

In step 525, the PE device may send an indication to any paired PE devices that the PE device is experiencing a fault. This indication may include specific details describing the fault such as, for example, whether the fault is a CFM or PW fault. Various methods of communicating such fault information between paired PE devices will be apparent to those of skill in the art. Method 500 may then proceed to step 535. Steps 535-550 may correspond to steps 415-430 of method 400. After indicating a "fault" or "no fault" status to the CE device, method 500 may proceed to end in step 555.

Figure 6:
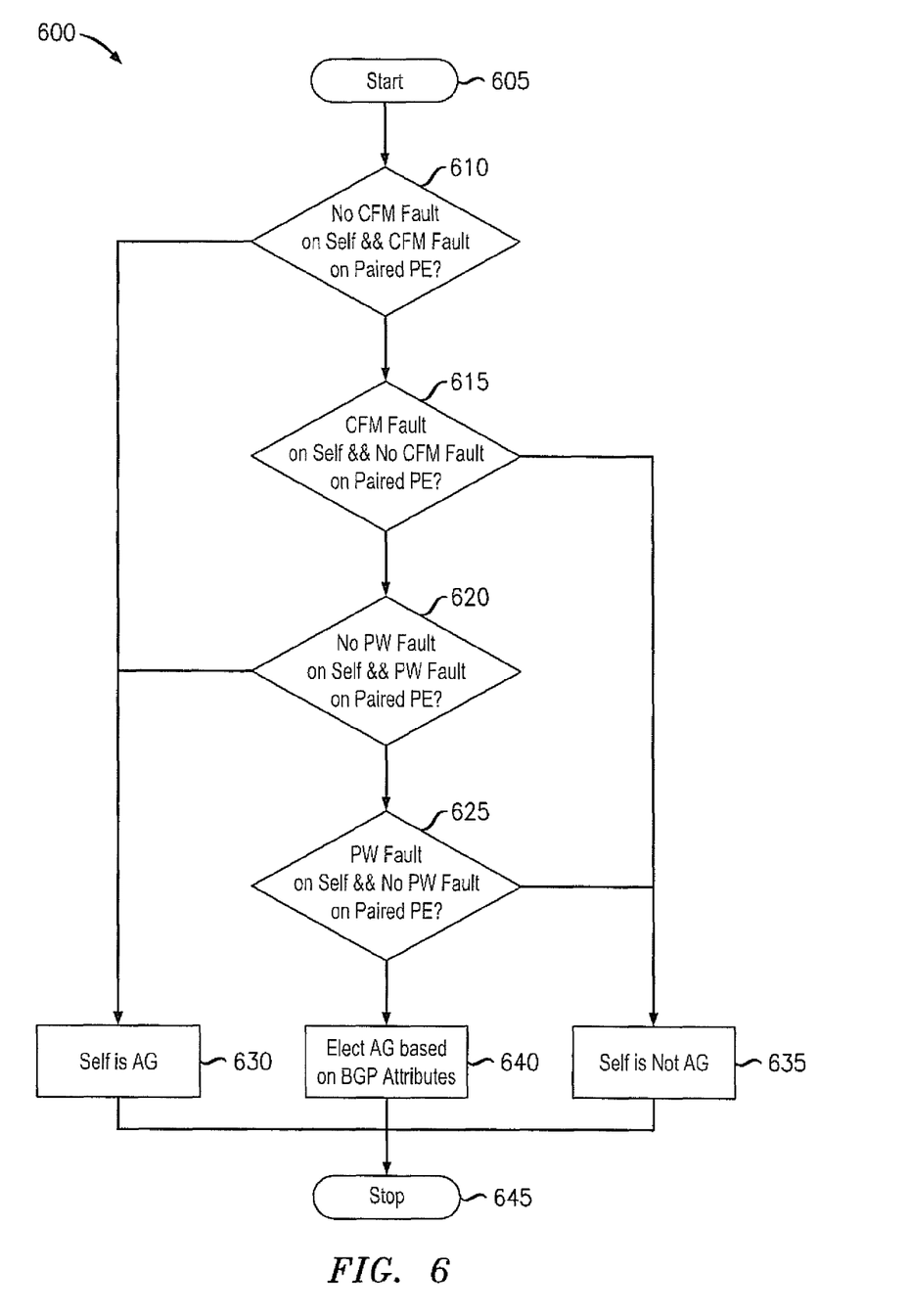
FIG. 6 illustrates an exemplary method for electing an active gateway.

FIG. 6 illustrates an exemplary method 600 for electing an active gateway. Method 600 may be performed by the components of a PE device such as PE device 300. For example, method 600 may be performed by BGP module 360. It should be noted that method 600 is one example of an AG election process and that alternative methods may be useful or appropriate in various alternative embodiments.

Method 600 may begin in step 605 and proceed to step 610 where the PE device may determine whether the PE device is the only device not currently experiencing a CFM fault. If the PE device is not experiencing a CFM fault but any paired PE devices are experiencing CFM fault, method 600 may proceed to elect the PE device AG in step 630. Otherwise, method 600 may proceed to step 615.

In step 615, the PE device may determine whether it is currently experiencing a CFM fault while at least one other PE device is not experiencing such a fault. If so, method 600 may proceed to determine that the PE device should not be elected AG in step 635. Otherwise, method 600 may proceed to step 620.

In step 620, the PE device may determine whether the PE device is the only device not currently experiencing a PW fault. In various embodiments, a PW fault may exist only when all appropriate PWs for a VLL are experiencing faults. If the PE device is not experiencing a PW fault but any paired PE devices are experiencing PW fault, method 600 may proceed to elect the PE device AG in step 630. Otherwise, method 600 may proceed to step 625.

In step 625, the PE device may determine whether it is currently experiencing a PW fault while at least one other PE device is not experiencing such a fault. If so, method 600 may proceed to determine that the PE device should not be elected AG in step 635. Otherwise, method 600 may proceed to step 640.

In step 640, the PE device may proceed to perform further election procedures based on the BGP-MH protocol. For example, the PE device may attempt to make an election based on a local preference, an AS-PATH attribute, and/or a NEXT-HOP attribute. Various modifications will be apparent to those of skill in the art. Once an AG has been elected, method 600 may proceed to end in step 645.

According to the foregoing, various embodiments enable the provision of a redundant, multi-technology, point-to-point service that does not require the learning of MAC addresses. For example, by leveraging BGP-MH designated forwarder election processes to control a linear protection switching, traffic can be reliably transported across a backbone or other network without incurring the overhead of an address learning system. Various additional advantages will be apparent to those of skill in the art.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A provider edge device for enabling connection redundancy, the provider edge device comprising:
    a customer edge interface configured to communicate with a customer edge device;
    an active gateway election module configured to determine whether the provider edge device will be an active gateway for a connection; and a fault reporting module configured to:
  based on a determination that the provider edge device will be the active gateway for the connection and regardless of whether a fault has been detected, send a no fault message to a customer edge device indicating that no fault is currently associated with a link between the customer edge device and the provider edge device, and
    based on a determination that the provider edge device will not be the active gateway for the connection and regardless of whether a fault has been detected, send a fault message to the customer edge device indicating that a fault is currently associated with the link between the customer edge device and the provider edge device, wherein:
the customer edge interface is configured to support a virtual leased line (VLL) service between the customer edge device and another customer edge device;
the fault reporting module is further configured to maintain a first maintenance endpoint (MEP) associated with a first link between the provider edge device and the customer edge device;
the active gateway election module, in determining whether the provider edge device will be an active gateway for a connection, is configured to execute a border gateway protocol (BGP) multihoming process to elect, among the provider edge device and an additional provider edge device, a designated forwarder for the VLL service;
the fault reporting module, in sending a no fault message to the customer edge device indicating that no fault is currently associated with the link, is configured to report a no-fault status associated with the first link to the customer edge device via the first MEP; and
the fault reporting module, in sending a fault message to the customer edge device indicating that a fault is currently associated with the link, is configured to report a fault status associated with the first link to the customer edge device via the first MEP.

2. The provider edge device of claim 1, further comprising:
a provider edge interface configured to communicate with a paired provider edge device;
wherein the active gateway election module is further configured to:
  determine, based on information received via the provider edge interface, that the paired provider edge device is currently experiencing a fault,
  wherein the active gateway election module is configured to determine whether the provider edge device will be an active gateway for a connection in response to determining that the paired provider edge device is currently experiencing a fault.

3. The provider edge device of claim 1, further comprising:
a provider edge interface configured to communicate with a paired provider edge device,
wherein the fault reporting module is further configured to detect a fault associated with the link between the provider edge device and the customer edge device, and
wherein the active gateway election module is further configured to, in response to the fault reporting module detecting the fault, send an indication to the paired provider edge via the provider edge interface that the provider edge is currently experiencing a fault.

4. The provider edge device of claim 1, further comprising:
a provider edge interface configured to communicate with a paired provider edge device, a backbone interface configured to communicate with at least one other device;
a pseudowire module configured to detect a fault on a link between the provider edge device and the at least one other device, and
wherein the is further configured to, in response to the pseudowire module detecting the fault, send an indication to the paired provider edge via the provider edge interface that the provider edge is currently experiencing a fault.

5. The provider edge device of claim 1, wherein the fault reporting module is a connectivity fault management module and, in sending a no fault message to a customer edge device indicating that no fault is currently associated with a link between the customer edge device and the provider edge device, the connectivity fault management module is configured to:
  construct a connectivity fault message that indicates that no fault has been detected; and
  transmit the connectivity fault message, via the customer edge interface, to a maintenance endpoint of the customer edge device.

6. The provider edge device of claim 1, wherein the active gateway module is configured to elect an active gateway based on at least one of:
  current connectivity fault management faults;
  current pseudowire faults; and
  border gateway protocol attributes.

7. The provider edge device of claim 1, wherein the connection is a control connection, and
wherein the fault reporting module is further configured to, for each fate shared connection of a set of fate-shared connections:
  based on a determination that the provider edge device will be the active gateway for the control connection, send a no fault message to a customer edge device indicating that no fault is currently associated with a link between the customer edge device and the provider edge device for the fate-shared connection; and
  based on a determination that the provider edge device will not be the active gateway for the control connection, send a fault message to the customer edge device indicating that a fault is currently associated with the link between the customer edge device and the provider edge device for the fate-shared connection.

8. A system comprising the provider edge of claim 1, further comprising:
the additional provider edge device, wherein the additional provider edge device is configured to:
  support the VLL service between the customer edge device and the other customer edge device;
  maintain a second maintenance endpoint (MEP) associated with a second link between the additional provider edge device and the customer edge device;
  execute the border gateway protocol (BGP) multihoming process to elect, among the provider edge device and the additional provider edge device, the designated forwarder for the VLL service; and
  report a status associated with the second link to the first edge device via the second MEP based on the outcome of the BGP multihoming process.

9. The system of claim 8, further comprising:
the customer edge device, wherein the customer edge device is configured to:
  maintain a third MEP associated with the first MEP that receives the report of the status of the first link from the first MEP; and maintain a fourth MEP associated with the second MEP that receives the report of the status of the second link from the second MEP; and switch VLL service traffic between the provider edge and the additional provider edge based on the status associated with the first link and the status associated with the second link.

10. The system of claim 8, wherein the provider edge device further comprises:

a provider edge interface configured to communicate with the additional provider edge device;

wherein the active gateway election module is further configured to:

determine, based on information received via the provider edge interface, that the additional provider edge device is currently experiencing a fault, wherein the active gateway election module is configured to determine whether the provider edge device will be an active gateway for a connection in response to determining that the additional provider edge device is currently experiencing a fault.

11. The system of claim 8, further comprising:

a provider edge interface configured to communicate with the additional provider edge device, wherein the fault reporting module is further configured to detect a fault associated with the link between the provider edge device and the customer edge device, and wherein the active gateway election module is further configured to, in response to the fault reporting module detecting the fault, send an indication to the additional provider edge via the provider edge interface that the provider edge is currently experiencing a fault.

12. The system of claim 8, further comprising:

a provider edge interface configured to communicate with the additional provider edge device, a backbone interface configured to communicate with at least one other device;

a pseudowire module configured to detect a fault on a link between the provider edge device and the at least one other device, and wherein the is further configured to, in response to the pseudowire module detecting the fault, send an indication to the additional provider edge via the provider edge interface that the provider edge is currently experiencing a fault.

13. The system of claim 8, wherein the fault reporting module is a connectivity fault management module and, in sending a no fault message to a customer edge device indicating that no fault is currently associated with a link between the customer edge device and the provider edge device, the connectivity fault management module is configured to:

construct a connectivity fault message that indicates that no fault has been detected; and transmit the connectivity fault message, via the customer edge interface, to a maintenance endpoint of the customer edge device.

14. The system of claim 8, wherein the active gateway module is configured to elect an active gateway based on at least one of:

current connectivity fault management faults;

current pseudowire faults; and border gateway protocol attributes.

15. The system of claim 8, wherein the connection is a control connection, and wherein the fault reporting module is further configured to, for each fate shared connection of a set of fate-shared connections:

based on a determination that the provider edge device will be the active gateway for the control connection, send a no fault message to a customer edge device indicating that no fault is currently associated with a link between the customer edge device and the provider edge device for the fate-shared connection; and based on a determination that the provider edge device will not be the active gateway for the control connection, send a fault message to the customer edge device indicating that a fault is currently associated with the link between the customer edge device and the provider edge device for the fate-shared connection.

* * * * *